United States Patent [19]

Dischert

[11] Patent Number: 4,641,188

[45] Date of Patent: Feb. 3, 1987

[54] PROGRESSIVE SCAN DISPLAY SYSTEM EMPLOYING LINE AND FRAME MEMORIES

[75] Inventor: Robert A. Dischert, Burlington, N.J.

[73] Assignee: RCA Corporation, Princeton, N.J.

[21] Appl. No.: 760,909

[22] Filed: Jul. 31, 1985

[51] Int. Cl.⁴ ............................................. H04N 7/01
[52] U.S. Cl. ................. 358/140; 358/21 V; 358/105; 358/160
[58] Field of Search ............... 358/140, 11, 105, 21 R, 358/160, 21 V, 136

[56] References Cited

U.S. PATENT DOCUMENTS

| 4,007,486 | 2/1977 | Inaba et al. | 358/13 |
| 4,198,651 | 4/1980 | Barton et al. | 358/21 V |
| 4,272,787 | 6/1981 | Michael et al. | 358/160 |
| 4,400,719 | 8/1983 | Powers | 358/21 R |
| 4,415,931 | 11/1983 | Dischert | 358/242 |

FOREIGN PATENT DOCUMENTS 0123174 10/1984 United Kingdom ................ 358/160

Primary Examiner—Howard W. Britton
Assistant Examiner—Victor R. Kostak
Attorney, Agent, or Firm—P. J. Rasmussen; P. M. Emanuel; R. G. Coalter

[57] ABSTRACT

A receiver includes a line store progressive scan processor and a frame store progressive scan processor for doubling the line rate of a video input signal for display. The video input signal includes an identifying signal signifying whether the fields that are derived from a common scene. The identifying signal is detected and used to control a switch for selectively coupling the output of the processors to a display such that frame store processed signals are displayed for fields derived from exactly the same scene and line store processed signals are displayed for "mixed" fields (i.e., fields from different frames or frames containing motion).

4 Claims, 8 Drawing Figures

PROGRESSIVE SCAN DISPLAY SYSTEM EMPLOYING LINE AND FRAME MEMORIES

FIELD OF THE INVENTION

This invention relates to television display systems and particularly to receivers or monitors the type employing "progressive scanning" to reduce the visibility of vertical line structure of displayed images.

BACKGROUND OF THE INVENTION

Progressive scan television receivers have been proposed wherein the horizontal line rate is doubled and each line of video is displayed twice thereby providing a displayed image having twice the usual number of scan lines and thus reduced visibility of vertical line structure. In one known form of progressive scan receiver each incoming horizontal line of video signal is stored in one of two line memorys. As one line is being stored in one memory the line previously stored in the other memory is recovered or "read" twice thereby providing two lines of time compressed video within one standard line interval. The memory output is applied to a display having a doubled horizontal sweep rate synchronized with readout of the memory thereby doubling the number of displayed lines of the video signal.

An example of the progressive scan receiver in which additional scan lines for the display are obtained by interpolation from the original scan lines is described by K. H. Powers in U.S. Pat. No. 4,400,719 entitled "TELEVISION DISPLAY SYSTEM WITH REDUCED LINE SCAN ARTIFACTS" which issued Aug. 23, 1983. A receiver in which the added lines are replicas of the original lines is described by R. A. Dischert in U.S. Pat. No. 4,415,931 entitled "TELEVISION DISPLAY WITH DOUBLED HORIZONTAL LINES" which issued Nov. 15, 1983.

It is recognized in the aforementioned Powers patent, for example, that field or frame memorys may be used to advantage in doubling the line rate in a progressive scan receiver. In such systems an entire frame of the video input signal is stored in a memory and recovered during one field interval for display thereby providing a full 525 lines of the incoming video signal during each field of the displayed signal. The advantage of such an arrangement is that the displayed signal is not subject to interpolation errors and preserves the full resolution of the transmitted signal. A disadvantage of such arrangements is that visual artifacts tend to be produced such as double images and serrated edge effects when there is motion in the scene due to field-to-field differences of the information stored in the memory.

A solution to the problem of motion artifacts proposed by Powers is to apply the video input signal to a motion detector and utilize the output of the motion detector to automatically switch between frame store progressive scan processing and line store progressive scan processing when motion is present. Motion is detected in the Powers arrangement by comparing a number of currently received picture elements (pixels) with corresponding picture elements delayed by one field and summing the result of the comparisons to produce a weighed average. The average is compared against a minimum motion threshold value to generate the motion indicating output signal for selecting between line and frame type progressive scan processing.

SUMMARY OF THE INVENTION

It is recognized herein that "adaptive" progressive scan systems which detect interfield motion for automatically switching between frame type processing and field type processing are subject to certain problems. In particular it is herein recognized that under low signal-to-noise ratio conditions the threshold of detection for motion may not be reached even when there is substantial motion within the scene. The effect is that the system may fail to switch from frame type processing to line type processing thereby producing a visual effect in which the displayed picture is not only snowy but additionally contains double images, serrated edges and other motion artifacts. To solve this problem one might consider the option of detecting the signal-to-noise ratio of the video input signal and simply disabling the frame store type processor when the signal-to-noise ratio is below some minimum threshold. Such an approach, however, is merely "cosmetic" and does not really solve the problem. The present invention is directed to meeting the need for an adaptive progressive scan display system which automatically switches between frame store and line store type processing as a function of field-to-field motion and which is relatively tolerant of noise which may accompany the video input signal.

A progressive scan display system embodying the invention includes and input means for receiving a video input signal of a given line rate and including an identification signal for signifying the presence in the video input signal of at least two sequential fields derived from a common scene. A first progressive scan processor doubles the line rate of the video input signal by storing each line and recovering the stored line twice during one line interval to provide a first video output signal. A second progressive scan processor doubles the line rate of the video input signal by storing each frame thereof and recovering the stored frame twice during one frame interval to provide a second video output signal. A detector coupled to the input means detects the identification signal and provides a control signal to a switch means for selectively coupling the video output signals to a display means.

BRIEF DESCRIPTION OF THE DRAWING

The invention is illustrated in the accompanying drawing wherein like elements are denoted by like reference designators and in which.

DETAILED DESCRIPTION

Figure 1:
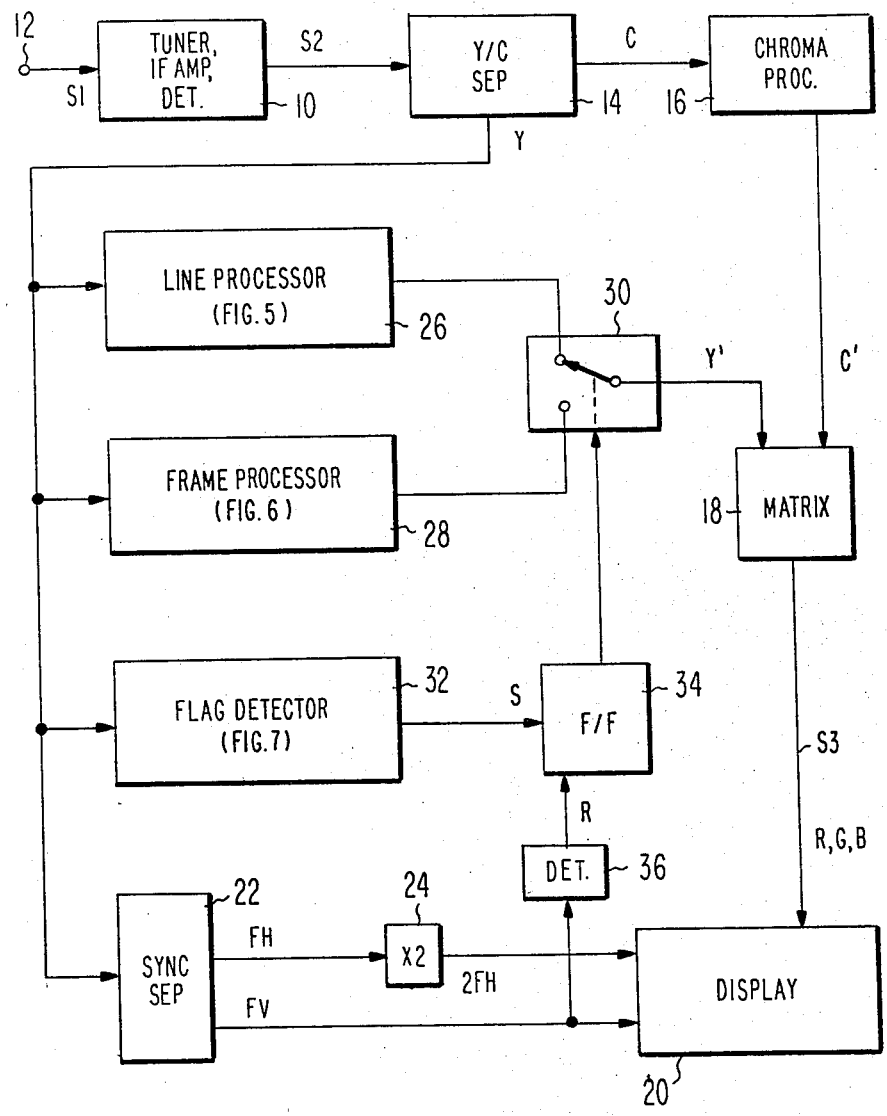
FIG. 1 is a block diagram of a receiver embodying the invention.
Figure 5:
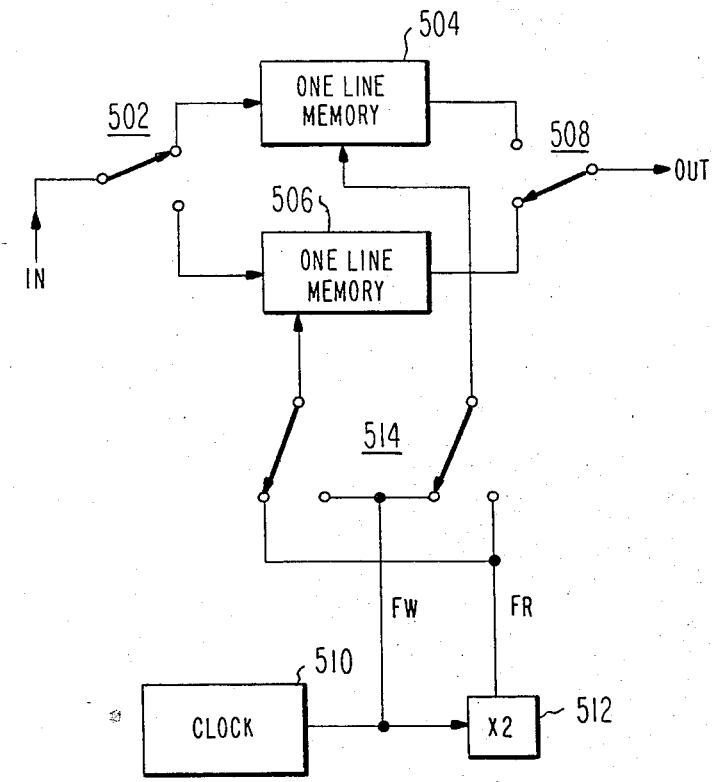
FIGS. 5 and 6 are block diagrams of line and frame type progressive scan processors suitable for use in the receiver of FIG. 1.

The receiver of FIG. 1 includes the tuner, IF amplifier and detector unit 10 of conventional design having an input terminal 12 for connection to a source (e.g., antenna, cable, etc.) of video input signal S1 and an output for providing a baseband video output signal S2 to a luma/chroma separator (Y/C) 14. Unit 14 supplies a chrominance output signal C to chroma processing unit 16 which doubles the line rate of the chroma signal. For purposes of the present invention unit 16 may comprise a line repeating type progressive scan processor described in the aforementioned Dischert patent and illustrated herein as FIG. 5. Briefly, in FIG. 5 a video input signal is alternatively applied by an video input switch 502 to a pair of one line memorys 504 and 506 and recovered from the memories by means of an output switch 508. As the input signal is stored in memory 504 it is recovered twice from memory 506 by means of switch 508. The switch positions are then reversed with the video input signal being stored in memory 506 and recovered from memory 504. Clock signals for controlling the memory read/write operations are provided by a clock source 510 which provides a write clock signal FW to a multiplier 512 which doubles the frequency of the write clock signal to produce a read clock signal FR. The read and write clock signals FW and FR are applied to respective ones of memorys 504 and 506 by means of a write clock switch 514 synchronized with the input and output switches 502 and 508 such that the memory which is reading is clocked at twice the rate of memory which is writing thereby doubling the line rate of the video output signal.

The double line rate chroma signal C' produced by processor 16 is combined with a double line rate luma signal Y' in a matrix unit 18 of conventional design which in turn supplies a double line rate video output signal S3 in component form (R, G, B) to a display unit 20. The luminance signal provided by luma/chroma separator 14 is applied to a sync separator 22 which supplies line rate (FH) and field rate (FV) sync signals to display 20. A frequency doubler 24 doubles the frequency of the line rate sync signals FH to thereby provide a raster on display 20 having 525 lines per field for displaying the double line rate RGB component signal in progressively scanned (non-interlaced) fashion.

The line rate of the luma signal Y is doubled by means of a line type progressive scan processor 26 and a frame type progressive scan processor 28 (FIGS. 5 and 6, respectively) having outputs coupled via a selector switch 30 to matrix 18. Switch 30 is controlled to select the output of processor 28 for each pair of fields of the video input signal S1 which are representative of the same scene and to select the output of processor 26 otherwise.

Figure 7:
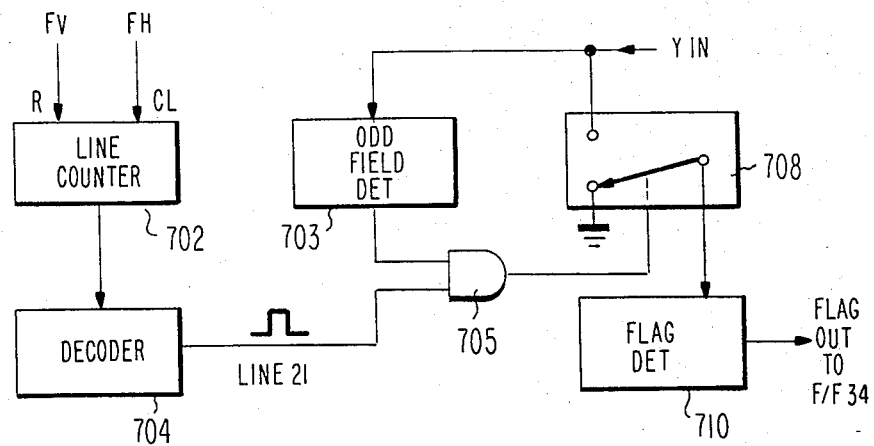
FIG. 7 is a block diagram of the flag signal decoder suitable for use in the receiver of FIG. 1.

Control for switch 30 is provided by a flag detector (FIG. 7) which detects the presence of an identification signal ("flag" hereinafter) in the vertical blanking interval of the input signal which signifys that the previous two frames are taken from exactly the same scene and supplies a set signal to the set input of a flip flop 34 which controls switch 30. When set, flip-flop 34 selects the output of processor 28 and when reset it selects the output of processor 26. Flip-flop 34 is initially reset at the start of each odd field by means of detector 36 coupled to receive the vertical sync signal FV from sync separator 22. Thus, if the flag signal is not present, operation reverts to line progressive scan processing.

It is a feature of the system of FIG. 1 there can be no inter-frame motion detection ambiguity at all because interframe motion, per se, is not detected. What is detected is the identity of particular fields as either belonging identically to the same scene or being derived from different scenes. The system is thus capable of very high levels of noise immunity because it is only necessary to detect the presence or the absence of the flag signal and not some predetermined threshold of relative motion.

Figure 2:
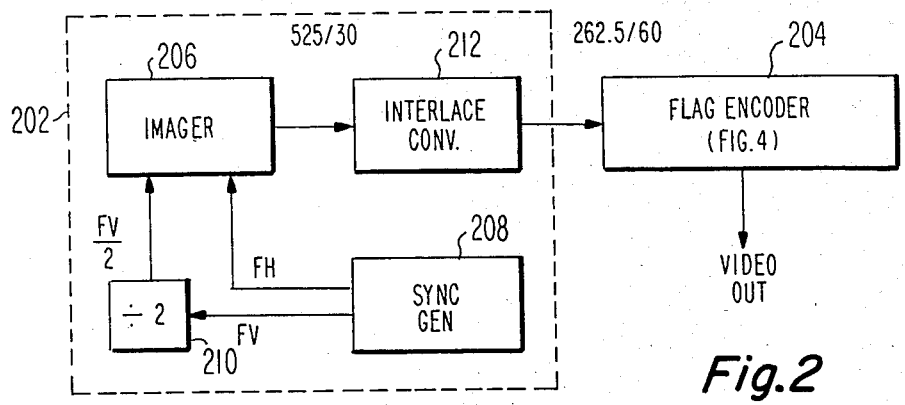
FIGS. 2 and 3 are block diagrams of camera and telecine sources, respectively suitable for use with the receiver of FIG. 1.
Figure 3:
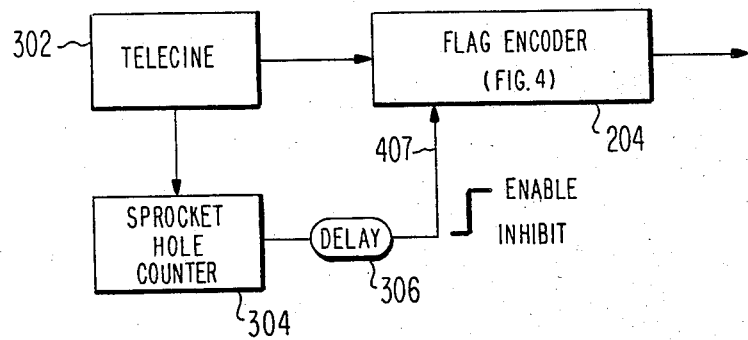

The flag signal for controlling switch 30 may be generated as shown in FIGS. 2 or 3. In FIG. 2 a camera 202 is specially modified so as to provide an interlaced video output signal having 262.5 lines per field, 60 fields per second in which each pair of odd and even fields is derived from exactly the same scene. A flag encoder (FIG. 4) 204 adds the indentifying signal on flag to a line (e.g., line 21) in the vertical blanking interval of odd fields provided by camera 202. Camera 202 comprises an imager 206 coupled to a sync signal generator 208 for receiving vertical (FV) and horizontal (FH) sync signals. The vertical sync signal FV is divided by two by means of divider 210. For NTSC standard sync signals provided by generator 208, imager 206 thus provides noninterlaced output signals having 525 lines per field and a field rate of 30 Hertz. An interlace convertor 212 of conventional design converts the output of imager 206 to interlace form of the standard 262.5 lines per field, 60 fields per second. Accordingly, each pair of fields produced by converter 212 is derived from a single 525 line scan of imager 206. These field pairs are identified by encoder 204 which inserts the identification signal in the vertical blanking interval of every other field of the signal provided by interlaced converter 212.

Figure 4:
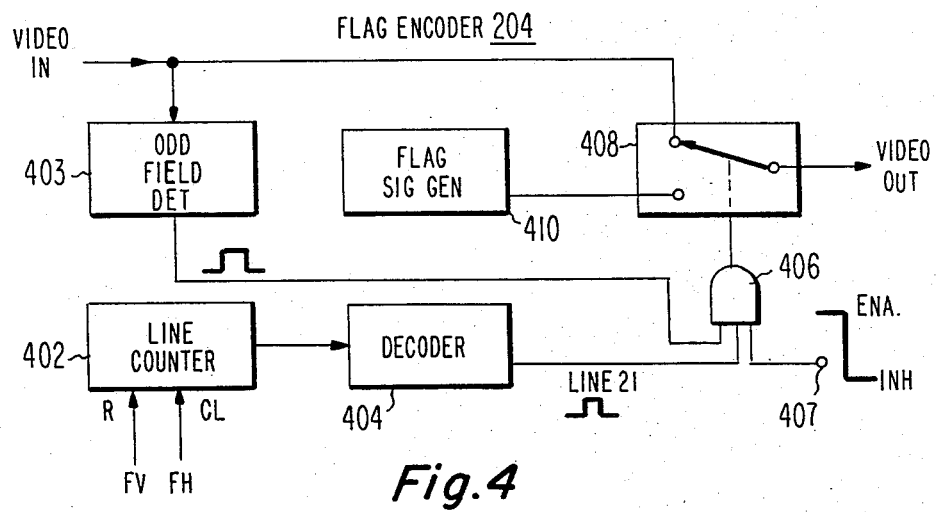
FIG. 4 is a block diagram of a flag encoder suitable for use with the sources of FIGS. 2 and 3.

Encoder 204 may be constructed as shown in FIG. 4. The encoder includes a switch 408 which normally couples the output of camera 202 to other studio equipment but selects the output of a flag signal genertor 410 when enabled during line 21 of odd fields by means of AND gate 406. One input of gate 406 is coupled to a control terminal for receiving an enable (High)/inhibit (low) control signal. Another input is coupled to the output of a decoder which identifies line 21 by decoding the output of a counter 402 that is clocked by signal FH and reset by signal FV. A third input of gate 406 is coupled to receive odd field identification signals from an odd field detector 403 which identifies odd fields by detecting the half line offset of the video input signal. When used with the camera of FIG. 2 the second input of gate 406 is connected to a source of positive voltage such that the output signal of gate 406 causes switch 408 to insert the flag signal in line 21 of the vertical blanking interval of odd fields. The purpose of terminal 407 is to inhibit the operation of the flag encoder for "mixed" fields. A "mixed" field, as used herein, means a pair of fields that come from different scenes. This becomes a consideration, as will be explained, when the video source is a telecine machince (rather than a camera) when converting film to NTSC format output signals. Switch 408 normally couples the output camera 202 to a recorder or broadcast transmitter for transmission to the receiver of FIG. 1 and couples the output of signal generator 410 to the transmitter or recorder when gate 406 is enabled during the selected line (21) of even fields of the vertical blanking interval. Signal generator 40 may be of conventional design but for maximum noise immunity it may include error check encoding circuitry for enhancing the noise immunity of the flag signal.

The signal source of FIG. 3 comprises a telecine machine having a sprocket hole counter 304 that identifies each film frame scanned by the machine. The film frame signal is supplied to terminal 407 of encoder 204 by a two field delay line (e.g., mono-stable multi-vibrator) 306 for inhibiting insertion of the flag signal during "mixed" fields.

In more detail, for PAL format signals, conversion from film to video does not require the spocket hole counter 304 since in the PAL system 2 fields of video are produced for each frame of film. For conversion to NTSC signals format, however, the spocket hole counter provides a film frame identifying signal which is delayed by two fields in element 306 for enabling flag encoder 204 to identify the first pair of fields from each film frame produced by telecine machine 302. In operation (for NTSC conversions) the telecine machine 302 provides two video fields from a first frame of film and 3 video fields from a second frame of film. Thus for any frame of film the first two fields are always taken from the same frame and encoded by flag encoder 204 with the special identifying signal in the vertical blanking interval. The absence of the flag for "mixed fields" is detected for operating switch 30 in the receiver as previously explained. If desired, telecine machine 302 may be modified for reducing the number of mixed fields in the film to NTSC conversion by changing the "pull down factor" from 2-3-2-3 to a different factor. As an example, a pull down sequence of 2-3-3-2 causes only one frame out of five to be mixed. If a pull down sequence of 2-2-4-2 is used no mixed frame will be produced but a motion artifact may be generated in some cases due to four fields being taken from the same film frame.

Figure 6:
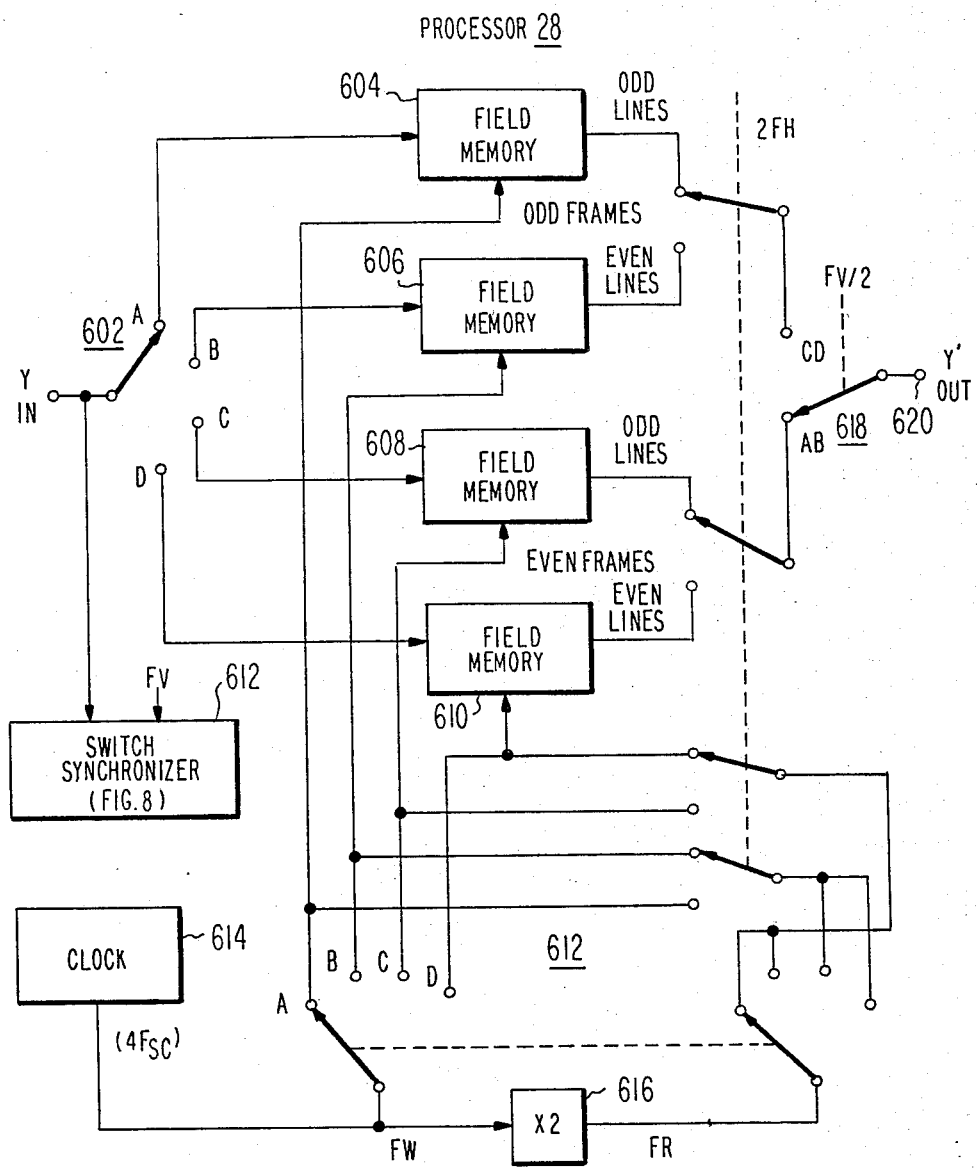

Processor 28 may be constructed as shown in FIG. 6. The luminance signal Y is sequentially applied by input signal switch 602 to four one-field memories 604 through 610. Switch 602 is synchronized by means of a switch synchronizer 612 to store odd lines in field memories 604 and 608 and even lines in field memories 606 and 610. A switching circuit (indicated generally as 612) supplies read and write clock signals FR and FW respectively to memorys 604-610 in sychronizism with switch 602. The write clock signal is produced by clock generator 614 and the read clock signal is produced by a frequency doubler 616 which doubles the output of clock 614. When switch 602 is in the position shown (a) switch 612 supplies a write clock signal to field memory 604 and alternatively supplies read clock signals to memories 608 and 610 which contain the previous two fields of the video input signal with odd lines being stored in memory 608 and even lines being stored in memory 610. An output switch (indicated generally as 618) alternatively couples the odd and even lines of memories 608 and 610 to an output terminal 620 to provide the double line rate video output signal Y'. Switch 602 is advanced at the field rate of the video input signal to thereby sequentially store odd frames in memories 604 and 606 and even frames in memories 608 and 610. After one frame of the video input signal has been stored in memories 604 and 606, the output switch connects these memories to the output terminal for producing the double line rate video output signal and storage of the next frame begins in field memories 608 and 610.

Figure 8:
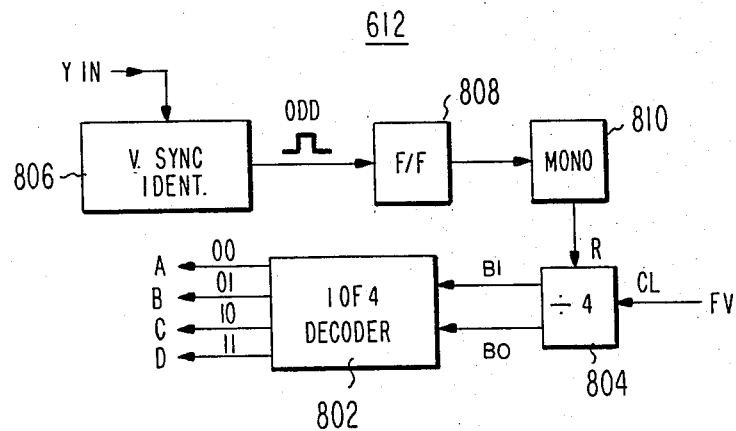
FIG. 8 is a block diagram of a switch synchronizer suitable for use in the frame store processor of FIG. 6.

Switch synchronizer 612 may be constructed as shown in FIG. 8. The control signals A, B, C and D for switches 602 and 612 are provided by means of a 1 of 4 decoder 802 coupled to the output of a divide by 4 counter 804 which is clocked by the vertical sync signal FV. To ensure that the switch is positioned at position A at the beginning of alternate odd fields, counter 804 is reset by means of a vertical sync detector 806. The output of detector 806 comprises a pulse for each odd field of the video input signal Y. This is applied to a flip flop 808 which changes state for every other odd sync pulse and triggers a mono stable multi vibrator 810 that resets counter 804. Since counter 804 is reset for every other odd field it is ensured odd lines are always stored in memorys 604 and 608 and even lines in memorys 606 and 610.

It will be appreciated that the flag signal described herein may be conveyed in portions of the video signal other than the vertical blanking interval (e.g., the horizontal blanking interval, the sound carrier, etc.). Also, although odd fields are flagged herein, the flag may be placed in even error fields. Further, video sources other than the disclosed camera and telecine machince may be used for generating the video signal provided that the flag signal is clearly associated with fields derived from exactly the same scene. To ensure that the double linerate video output signals of processor 16, 26 and 28 are properly registered, the video input or output signals of processors 16 and 26 may be delayed by an amount such that the overall delay substantially equals the processing delay of the frame processor 28.

What is claimed is:

1. a progressive scan display system, comprising:
   (a) input means for receiving a video input signal of a given line rate and including an identification signal having a first condition for signifying the presence in said video input signal of a first pair of sequential fields representative of a common scene and having a second condition for signifying the presence in said video input signal of a second pair of sequential fields not representative of a common scene;
   (b) first progressive scan processor means coupled to said input means for doubling the line rate of said video input signal including line stores for storing a line of said video input signal and recovering the stored line twice during one line interval to provide a first line store processed video output signal;
   (c) second progressive scan processor means coupled to said input means for doubling the line rate of said video input signal including frame store means for storing at least one frame of said video input signal and recovering the stored frame twice during one frame interval to provide a second frame store processed signal;
   (d) detector means coupled to said input means for detecting said identification signal and providing a control signal;
   (e) display means; and
   (f) switch means coupled to receive said frame store processed and line store processed video output signals and responsive to said control signal for coupling said frame store processed video output signal to said display means for display of each said first pair of fields representative of said common scene and for coupling said line store processed video output signal to said display means for display of each said second pair of fields not representative of a common scene.

2. A system as recited in claim 1 wherein said frame store means includes first field memory means for storing odd lines of said video input signal, second field memory means for storing even lines of said video input signal and switch means for alternately selecting between the output of said first and second field memory means for developing said second frame store processed video output signal.

3. A system as recited in claim 1 wherein said detector means includes means for identifying a specified line of a specified field of each said pair of fields for enabling detection of said identification signal during said line in said field and for inhibiting detection of said identification signal otherwise.

4. A television receiver, comprising:
input means for receiving a video input signal of a given line rate and including an identification signal having a first condition for identifying each pair of sequential fields representative of a common scene and having a second condition for identifying fields not representative of a common scene;
display means;
dual mode processor means having input means for recieving said video input signal and output means coupled to supply a procesed video output signal of double said given line rate to said display means for display in progressive scan fashion, said processor means having a frame-store processing mode for deriving said video output signal from sequential fields of said video input signal and having a line store processing mode for deriving said video output signal from sequential lines of said video input signal to produce said video output signal; and
mode control means coupled to said input means for detecting said identification signal and coupled to said processor means for placing said processor means in said first processing mode for each said pair of sequential fields representative of said common scene and for placing said processor means in said second processing mode otherwise.

* * * * *